(12) United States Patent
Billings et al.

(10) Patent No.: US 11,941,477 B2
(45) Date of Patent: Mar. 26, 2024

(54) SYSTEMS AND METHODS FOR IMPROVED RFID COUNTING

(71) Applicant: Datascan, Carrollton, TX (US)

(72) Inventors: Herb Billings, Carrollton, TX (US); Kevin Arnold, Carrollton, TX (US); Marc Fukuda, Carrollton, TX (US); John Rayner, Carrollton, TX (US)

(73) Assignee: Datascan, Carrollton, TX (US)

(*) Notice: Subject to any disclaimer, the term of this patent is extended or adjusted under 35 U.S.C. 154(b) by 34 days.

(21) Appl. No.: 17/721,548

(22) Filed: Apr. 15, 2022

(65) Prior Publication Data

US 2022/0335235 A1 Oct. 20, 2022

Related U.S. Application Data

(60) Provisional application No. 63/176,739, filed on Apr. 19, 2021.

(51) Int. Cl.
*G06K 7/10* (2006.01)
(52) U.S. Cl.
CPC ............... *G06K 7/10366* (2013.01)
(58) Field of Classification Search
CPC ... G06K 7/10366; G06K 19/08; G06Q 10/087
USPC ........................................... 235/451
See application file for complete search history.

(56) References Cited

U.S. PATENT DOCUMENTS

| | | | |
|---|---|---|---|
| 10,755,231 B1* | 8/2020 | Kim ................... | G06Q 10/087 |
| 2009/0210325 A1* | 8/2009 | Borom ................ | G06Q 10/087 |
| | | | 705/28 |
| 2015/0262116 A1* | 9/2015 | Katircioglu .......... | G06Q 10/087 |
| | | | 705/28 |
| 2019/0172004 A1* | 6/2019 | Taylor ................ | G06Q 10/1097 |

* cited by examiner

*Primary Examiner* — Toan C Ly
(74) *Attorney, Agent, or Firm* — Kirby Drake

(57) ABSTRACT

Systems and methods to validate RFID counts may be provided. A business may affix temporary or permanent location tags with barcodes throughout an area to be counted, and the location tags may then be recorded. Manual counters may perform a piece count of items associated with each location tag. RFID counters may perform an RFID read of items associated with each location tag. All RFID reads may be associated with their most likely location tag. The manual piece count may be compared to the total of RFID tags assigned to each location tag. Locations may be rejected where the totals do not match. Locations rejected by the manual piece count comparison may then be barcode scanned and compared to the RFID reads for each location tag required to be barcode scanned. Resolution may be performed for locations where the barcode item counts do not match the RFID item counts.

14 Claims, 13 Drawing Sheets

SYSTEMS AND METHODS FOR IMPROVED RFID COUNTING

CROSS-REFERENCE TO RELATED APPLICATION

The present application is a non-provisional of, and claims priority to, U.S. patent application No. 63/176,739, filed Apr. 19, 2021, which is incorporated by reference in its entirety.

FIELD OF THE DISCLOSURE

The present disclosure generally relates to radio-frequency identification (RFID) counting, and more particularly to highly accurate RFID counting.

BACKGROUND

RFID tags typically provide businesses with the ability to perform accurate and fast counts of items in inventory, whether that be retail, warehouse, etc. RFID technology spectacularly delivers on the "fast" promise but is a little short on the "accurate" promise. The accuracy of RFID tag reads is not in question; if an RFID reader detects the tag, then the captured data is considered accurate. However, unread items can create potential for significant inaccuracies. These unread items may include, but are not limited to, items missing RFID tags, RFID tags out of read range, and/or RFID tags affected by interference from metal and liquid. In addition, tags without items may be read and counted when they should not be included in the final item counts. This is a growing problem, for example, as thieves remove tags and hide them behind permanent fixtures.

Using RFID technology may deliver a higher level of accuracy for operational adjustments where businesses update their stock-on-hand levels to improve their inventory record accuracy. Missed reads are often caught and corrected in the next cycle count, which are usually conducted at least once each week. With inaccuracies often lasting only a week, this level of accuracy works very well to support operational requirements, but the potential inaccuracies make businesses reluctant to use a single RFID cycle count to generate financial adjustments, such as those associated with auditor-required annual physical inventories. In addition, retailers are needing better counting accuracy to satisfy auditor requirements. Further, issues arise when a retailer has a mix of items where some have RFID tags while others have barcodes.

SUMMARY

Embodiments of the present disclosure may provide systems and methods to validate RFID counts. A business may affix temporary or permanent location tags with barcodes throughout an area to be counted, and the location tags used in the count system may then be recorded. Manual counters may perform a piece count of all items associated with each location tag. RFID counters may perform an RFID read of all items associated with each location tag. All RFID reads may be associated with their most likely location tag. The manual piece count may be compared to the total of RFID tags assigned to each location tag. Locations may be rejected where the totals do not match, and locations may be accepted where the totals do match. Locations rejected by the manual piece count comparison may then be recounted with a barcode scanner. The barcode scans may be compared to the RFID reads for each location tag required to be barcode scanned. Resolution may be performed for locations where the barcode item counts do not match the RFID item counts. Users may then be presented with a comparison of counts by item, and discrepancies may be manually resolved.

Other embodiments of the present disclosure may provide a method to validate radio frequency identification (RFID) counts comprising: affixing location tags with barcodes through an area to be counted; recording the location tags; performing an RFID read of all items associated with each of the location tags, wherein the RFID read is associated with a most likely location tag; comparing a piece count of all items associated with each of the location tags to the RFID read to identify whether the piece count matches the RFID read; rejecting a location when the piece count does not match the RFID read; and accepting a location when the piece count matches the RFID read. The location tags may be temporary and may be affixed prior to a count, or the location tags may be permanent. The method also may include using a barcode scanner, recounting when the piece count does not match the RFID read; and comparing the barcode scans from the recount to the RFID read to identify whether a count from the barcode scans matches a count from the RFID read. The method may further include performing resolution for locations where the count from the barcode scans does not match the count from the RFID read. Performing the RFID read step may further comprise uploading to a server one or more items of RFID tag data selected from the following: a location tag identifier, start time, end time, RFID tag, number of reads and/or average signal strength for each RFID tag. Associating the RFID read with the most likely location tag may further comprise ranking locations for each RFID tag by highest signal strength, highest average signal strength, and/or highest number of reads within a location's read timeframe; calculating a combined score for each location and RFID combination; and assigning the location with a highest combined score to each RFID tag. The method also may include identifying unassociated RFID reads or RFID reads not associated with any location tag; scanning a barcode attached to the tag associated with an item to be counted; and adding inaccessible tags or unreadable RFID tags to a do not count list. The method may further comprise completing a count when all data is collected for all location tags recorded as used, all count exceptions are resolved, all invalid items are resolved, and all RFID reads not associated with any location tags are resolved. Location tags may be electronic and have a barcode and/or human-readable text.

Further embodiments of the present disclosure may provide a method to validate radio frequency identification (RFID) counts comprising: affixing location tags with chips to be read through an area to be counted; recording the location tags; performing an RFID read of all items associated with each of the location tags, wherein the RFID read is associated with a most likely location tag; comparing a piece count of all items associated with each of the location tags to the RFID read to identify whether the piece count matches the RFID read; rejecting a location when the piece count does not match the RFID read; and accepting a location when the piece count matches the RFID read. The location tags may be temporary or may be permanent. Performing the RFID read step may further include uploading to a server one or more items of RFID tag data selected from the following: a location tag identifier, start time, end time, RFID tag, number of reads and/or average signal strength for each RFID tag. Associating the RFID read with the most likely location tag may further comprise ranking locations for each RFID tag by highest signal strength, highest average signal strength, and/or highest number of reads within a location's read timeframe; calculating a combined score for each location and RFID combination; and assigning the location with a highest combined score to each RFID tag. The method also may include completing a count when all data is collected for all location tags recorded as used, all count exceptions are resolved, all invalid items are resolved, and all RFID reads not associated with any location tags are resolved.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide a RFID counting method that may be used when a retailer has a mix of items where some have RFID tags while others have barcodes. This RFID counting method may provide better counting accuracy to satisfy auditor requirements.

Figure 1:
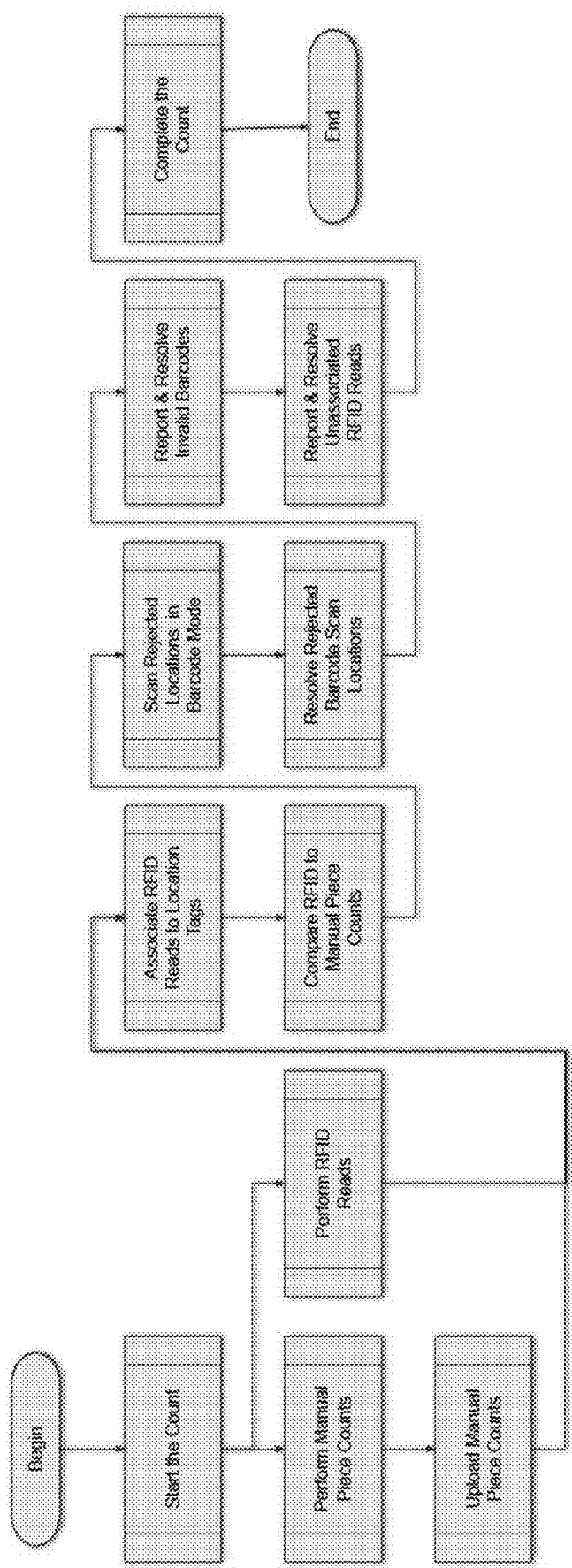
FIG. 1 depicts a flow chart of an RFID counting method according to an embodiment of the present disclosure.

FIG. 1 depicts a flow chart of an RFID counting method according to an embodiment of the present disclosure. As depicted herein, an RFID count may be started. A manual piece count may be performed, and the manual piece count may be uploaded. Additionally, RFID reads may be performed. Once the manual piece count is uploaded and/or RFID reads are performed, RFID reads may be associated to location tags. The RFID reads may be compared to manual piece counts. Rejected locations may be counted with barcode scanners. Rejected barcode scan locations may be resolved. Invalid barcodes may be reported and resolved. Unassociated RFID reads may then be reported and resolved, and the count may be completed. Each step within the flow chart of FIG. 1 are further described below.

Location tags may be used to divide a space to be counted into more manageable and referenceable locations. Each location tag may contain a non-repeating serial number unique within the space or location. This serial number may be represented in both barcode and human-readable form in embodiments of the present disclosure. Location tags may be placed so each tag may represent about 30-50 total items. The location tags should be placed in a consistent way so it may be identifiable which items belong to specific location tags.

Figures 2A, 2B:
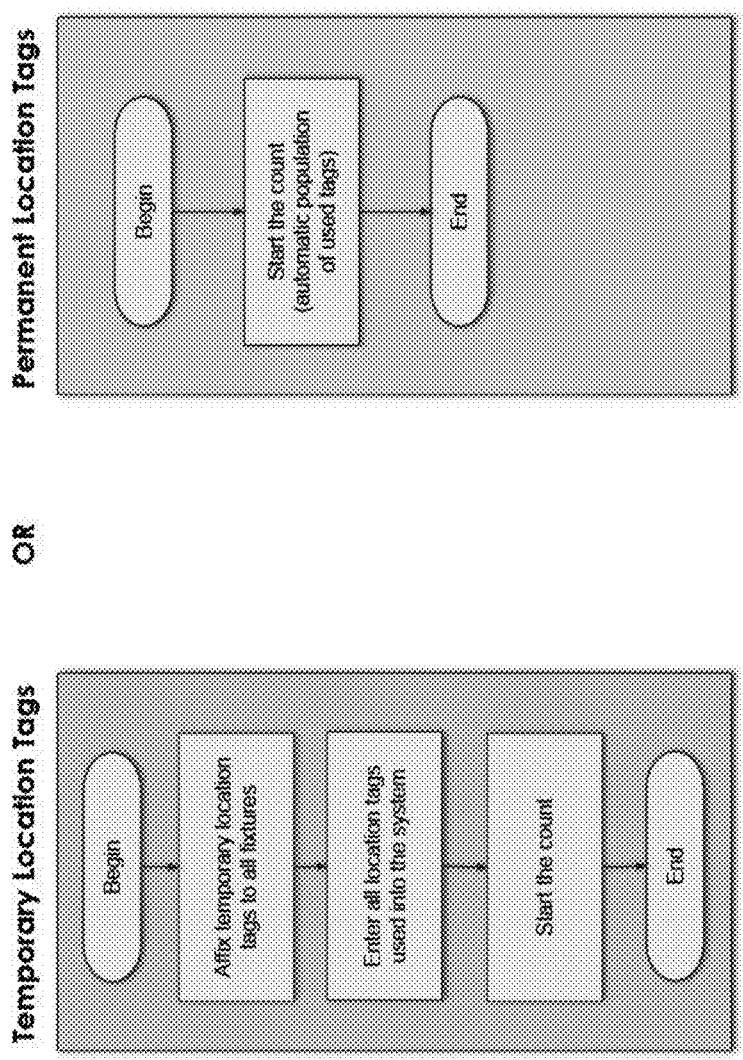
FIGS. 2A and 2B depict a step of starting the count for temporary location tags and permanent location tags according to embodiments of the present disclosure.

FIGS. 2A and 2B depict the step of starting the count for temporary location tags (FIG. 2A) and permanent location tags (FIG. 2B) according to embodiments of the present disclosure. As depicted in FIG. 2A, temporary location tags may be affixed to fixtures throughout a space. These temporary location tags should be affixed prior to each count. The location tags may be entered into a system, and the count may be started. As depicted in FIG. 2B, permanent location tags may be affixed to fixtures throughout the space upon initial implementation of the system, and the count may be started, which may involve automatic population of used tags. It should be appreciated that regardless whether temporary or permanent location tags are used, the used location tag numbers in the system may be entered to measure counting progress and to determine when all location tags have been completed. Temporary tags may support embodiments where manual piece counters work separately from a person using an RFID reader; however, it should be appreciated that permanent tags may not be utilized in these embodiments because they cannot be written on.

Figure 3:
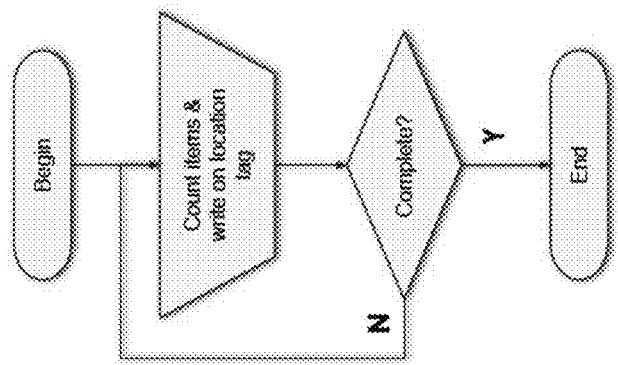
FIG. 3 depicts a step of performing manual piece counts according to an embodiment of the present disclosure.

FIG. 3 depicts a step of performing manual piece counts according to an embodiment of the present disclosure. In this step, manual piece counters may count the number of items for each location tag and write the total units on the location tag. It should be appreciated that these tags will be temporary tags, as the total units can be written on these types of tags. If the count is complete, then this step may end; however, if not all items have been counted and written on the location tag, the count/write step may be repeated until completed.

Figure 4:
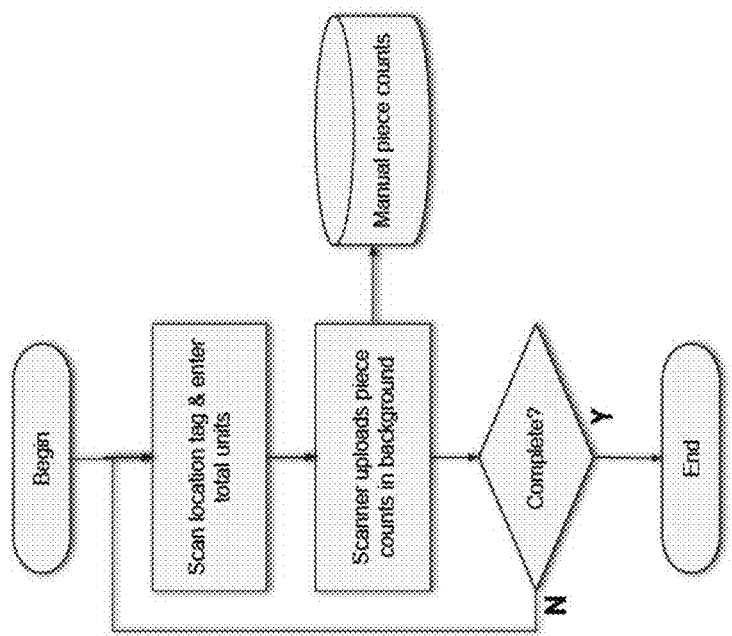
FIG. 4 depicts a step of uploading manual piece counts according to an embodiment of the present disclosure.

FIG. 4 depicts a step of uploading manual piece counts according to an embodiment of the present disclosure. A location tag barcode may be scanned, or a location tag chip may be read, and the total number of units written on the location tag may be entered. A scanner or reader may then upload the piece counts to a server. If all the manual piece counts are uploaded, this step may end; however, if not all piece counts are uploaded, this step may be repeated until completed. It should be appreciated that a single employee may perform this uploading step as may perform the step described in FIG. 3. This employee performing the uploading step may be the same as an employee that may perform the RFID read as will be described in FIG. 5. However, there may be embodiments of the present disclosure where an employee may only be tasked with uploading the manual piece counts.

Figure 5:
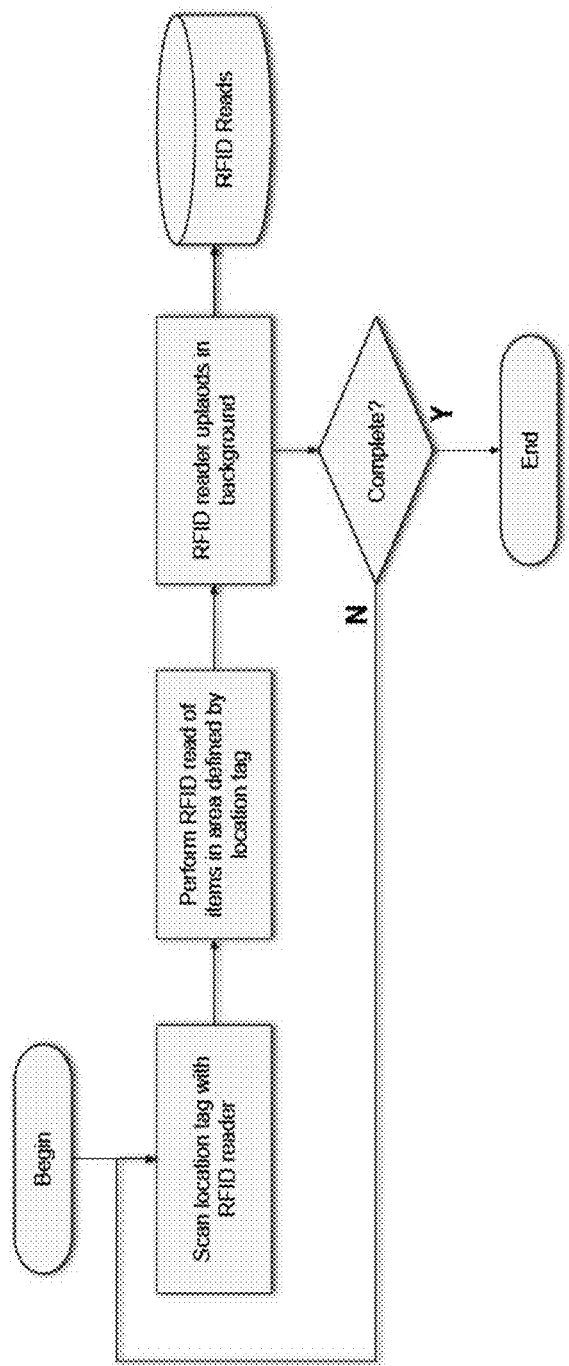
FIG. 5 depicts a step of performing RFID reads according to an embodiment of the present disclosure.

FIG. 5 depicts a step of performing RFID reads according to an embodiment of the present disclosure. A person using an RFID reader (which may be mobile) may scan a location tag barcode or read a location tag chip to indicate a location associated with the RFID reads to be performed. An RFID read of items in an area defined by the location tag may be performed. This RFID read may begin by engaging a trigger or a touchscreen input (or other similar input mechanism).

The RFID reader may be waved near items associated with the location tag. The RFID read may be stopped by releasing a trigger or utilizing a touchscreen button (or other similar input mechanism). This step may be repeated for all locations tags to be counted.

The RFID reader may upload in the background. More specifically, information including, but not limited to, a location tag identifier, start time, end time, RFID tag, number of reads and/or average signal strength for each RFID tag may be uploaded to a server. It should be appreciated that not all this information may be uploaded in each instance; however, additional information may be uploaded in embodiments of the present disclosure. It also should be appreciated that this collection of RFID tag data may be more robust than the items that may be visually associated with the location tag; RFID technology can read tags up to 10' away and specific items within that range may not be identified. RFID tags not found on the business' list of valid tags may be ignored in embodiments of the present disclosure.

Figure 6:
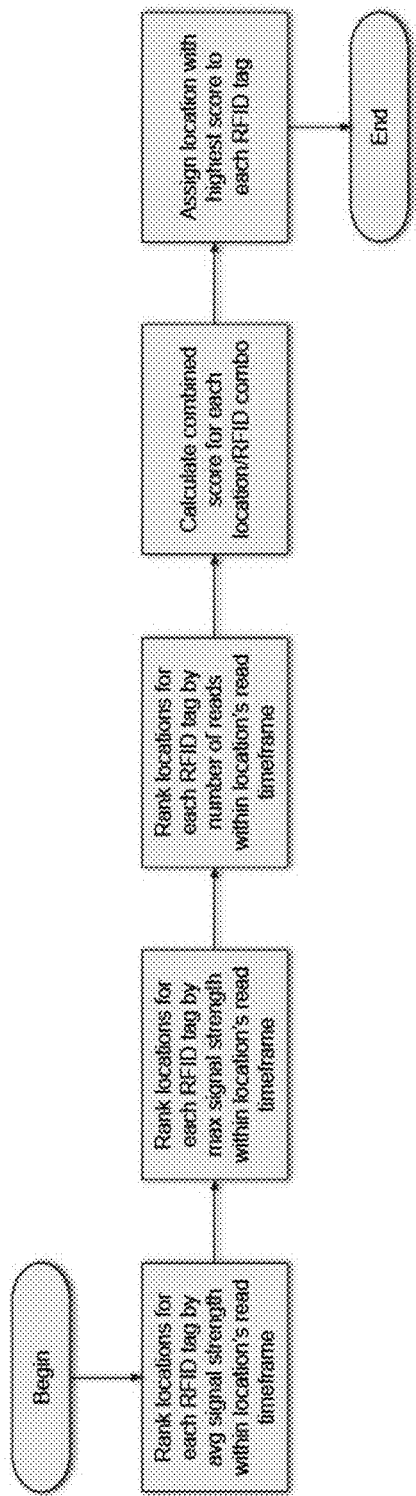
FIG. 6 depicts a step of associating RFID reads to location tags according to an embodiment of the present disclosure.

FIG. 6 depicts a step of associating RFID reads to location tags according to an embodiment of the present disclosure. As location piece counts and RFID reads are uploaded, a server or mobile device may assign only one location tag to each RFID tag based on the RFID tag's read attributes recorded within the start and end times of each location tag. These attributes include, but are not limited to, highest signal strength, highest average signal strength, and/or highest number of reads. While FIG. 6 depicts ranking locations for each RFID tag by average signal strength, then ranking locations by maximum signal strength, and then ranking locations by number of reads, it should be appreciated that these rankings may be done in different orders and/or simultaneously without departing from the present disclosure. A combined score may be calculated for each location/RFID combination, and a location with the highest score may be assigned to each RFID tag.

Figure 7:
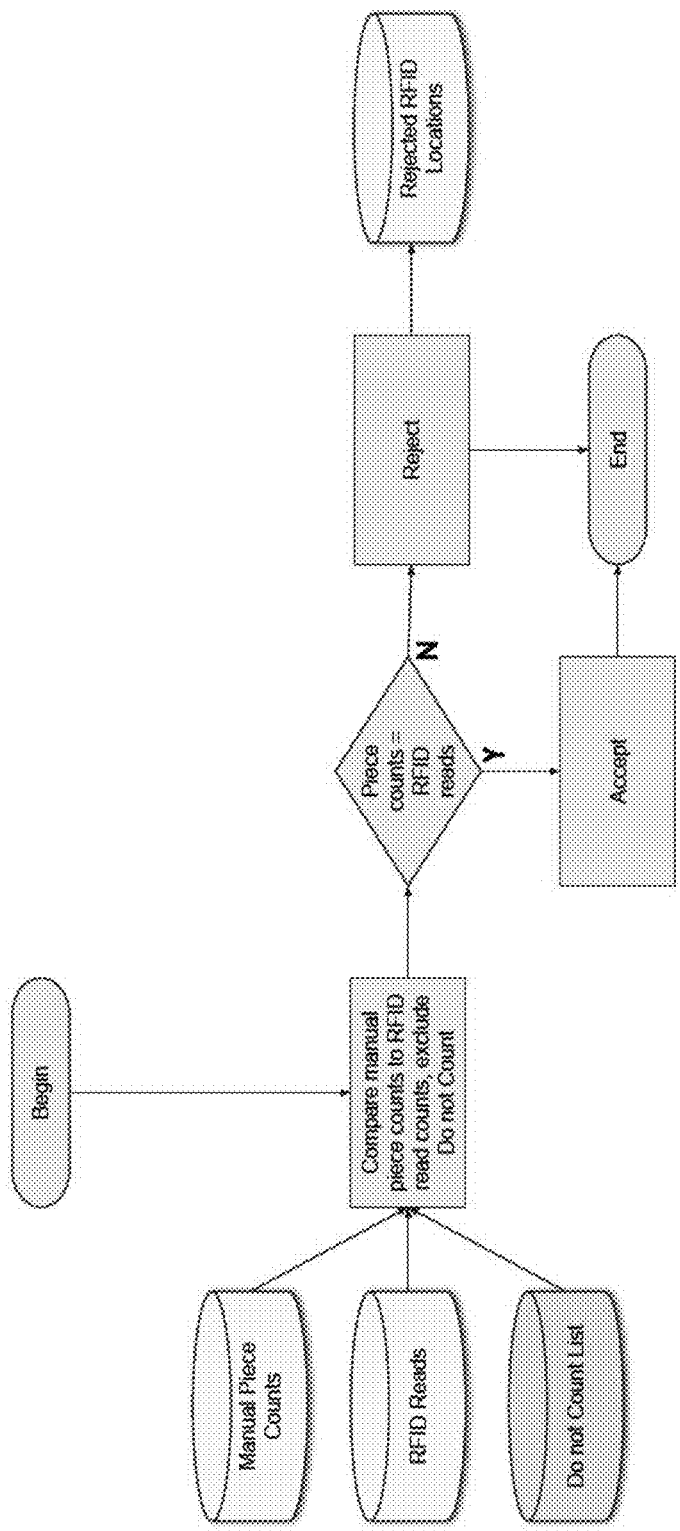
FIG. 7 depicts a step of comparing RFID to manual piece counts according to an embodiment of the present disclosure.

FIG. 7 depicts a step of comparing RFID to manual piece counts according to an embodiment of the present disclosure. Manual piece counts may be compared to RFID read counts, excluding RFID tags on the "do not count" list. A program on a server and/or a mobile device may access manual piece counts, RFID reads, and/or the "do not count" list to perform this comparison. This comparison includes comparing each location tag's manual piece count to a total item count assigned by the association process. The system may reject location tags where the two total counts do not match. If the piece counts equal the RFID reads, the count may be accepted. Otherwise, the count may be rejected, and the rejected RFID locations may be identified.

Figure 8:
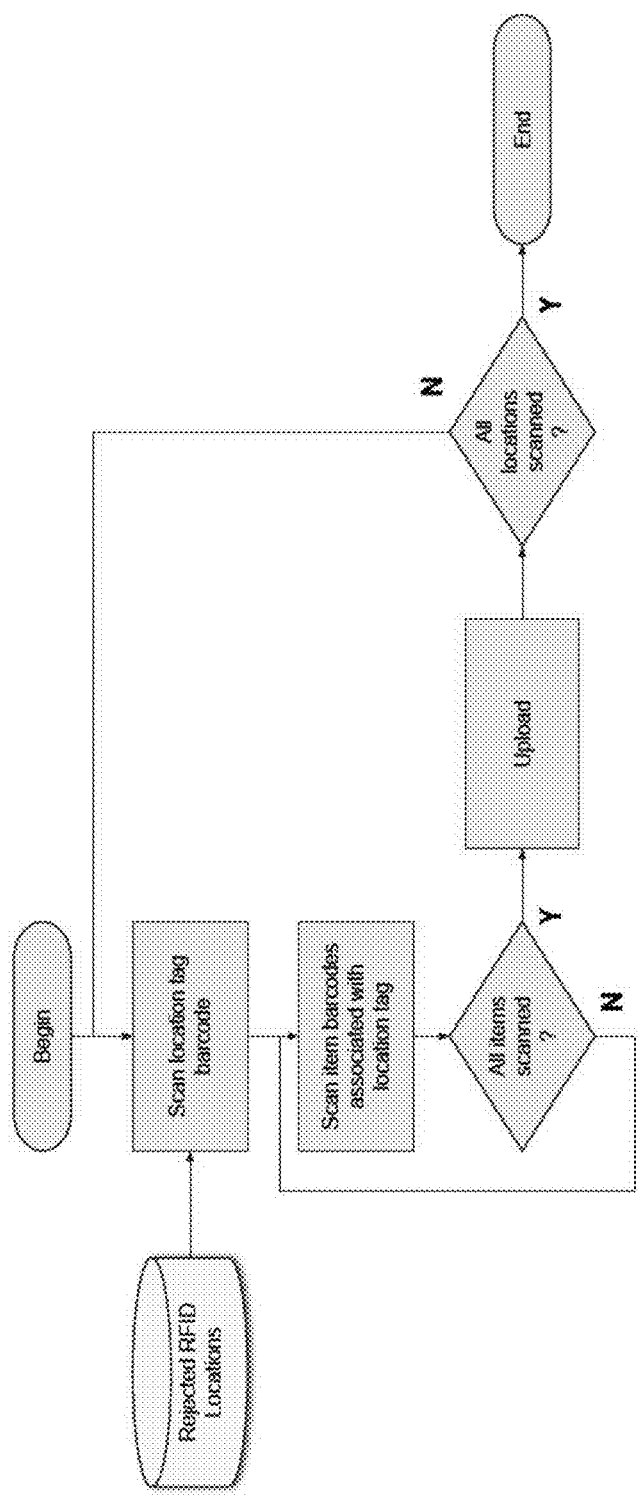
FIG. 8 depicts a step of counting rejected locations with barcode scanners according to an embodiment of the present disclosure.

FIG. 8 depicts a step of scanning rejected locations in barcode mode according to an embodiment of the present disclosure. The rejected RFID locations identified in FIG. 7 may be populated. A rejected location tag may be scanned or read, and then barcodes for all items associated with that location tag may be scanned. A program may upload the barcode scans as each location is completed, and the step depicted in FIG. 8 may be repeated for all rejected location tags.

Figure 9:
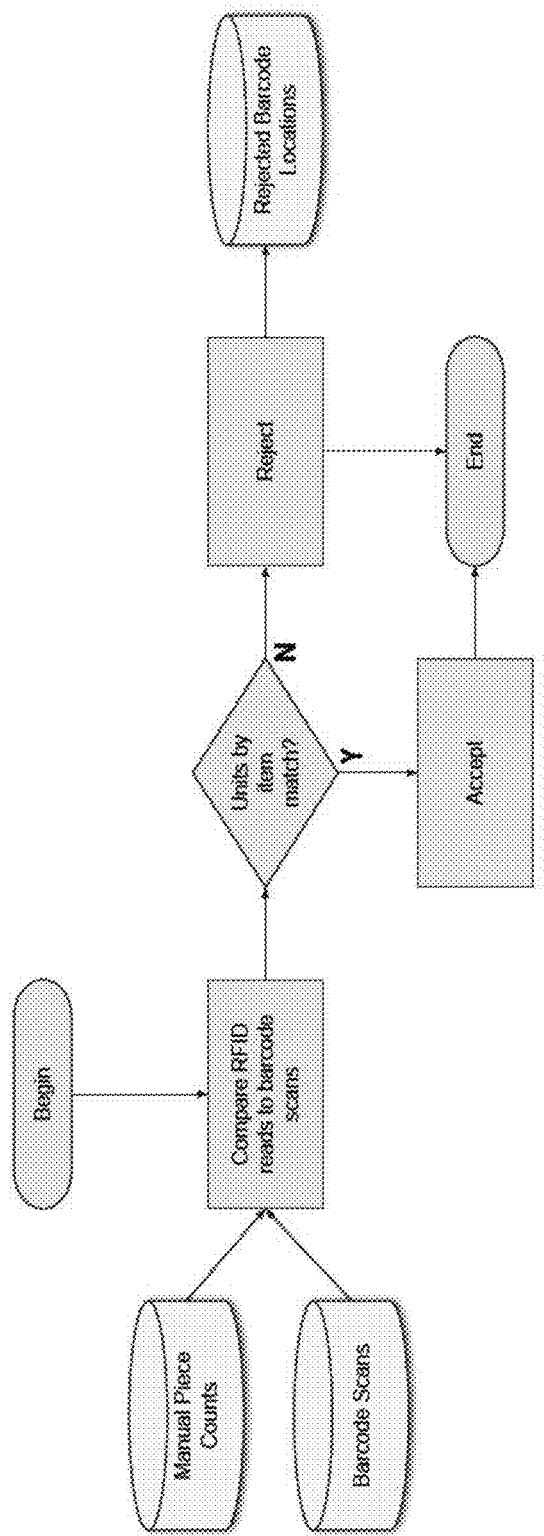
FIG. 9 depicts a step of comparing barcode scans to RFID reads according to an embodiment of the present disclosure.

FIG. 9 depicts a step of comparing barcode scans to RFID reads according to an embodiment of the present disclosure. Using the RFID reads and barcode scans, the RFID reads may be compared to the barcode scans for each barcode-scanned location. If the units by item match, the comparison may be accepted; however, if there is not a match, the comparison may be rejected, and the rejected barcode locations may be resolved.

Figure 10:
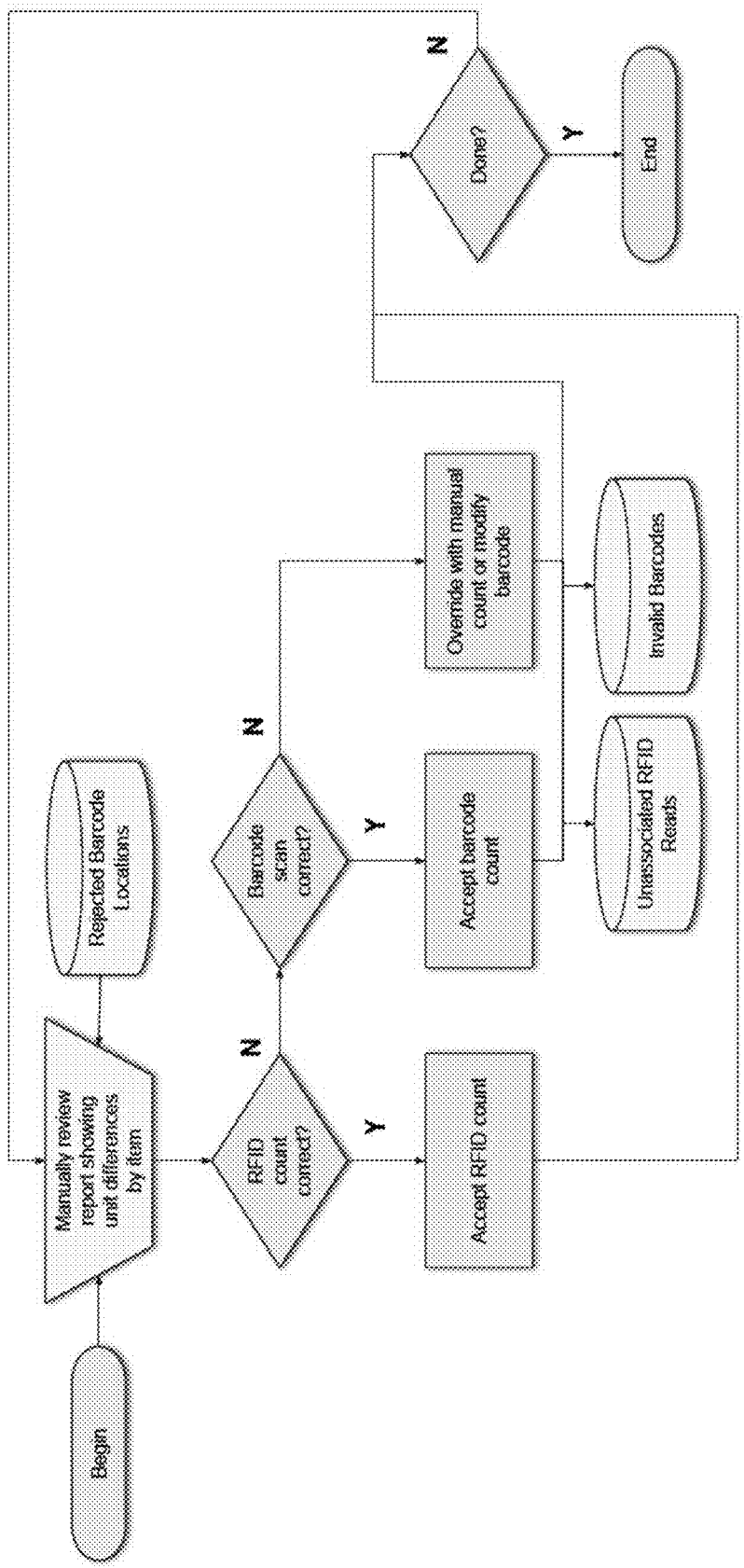
FIG. 10 depicts a step of resolving rejected barcode scan locations according to an embodiment of the present disclosure.

FIG. 10 depicts a step of resolving rejected barcode scan locations according to an embodiment of the present disclosure. An interface may be provided to view all locations where the unit counts by item do not match between the barcode scans and the associated RFID reads. The rejected barcode locations may be displayed, and a report showing unit differences by item may be reviewed. If the RFID count is correct, the RFID count may be accepted. If the RFID count is not correct, the barcode scan may be evaluated to determine if it is correct. If it is correct, the barcode count may be accepted. If the barcode scan is not correct, it may be overridden by a manual count, or the barcode may be modified. Unassociated RFID reads and/or invalid barcodes may be identified based on the accepted barcode count and/or the overridden manual count or modified barcode.

Figure 11:
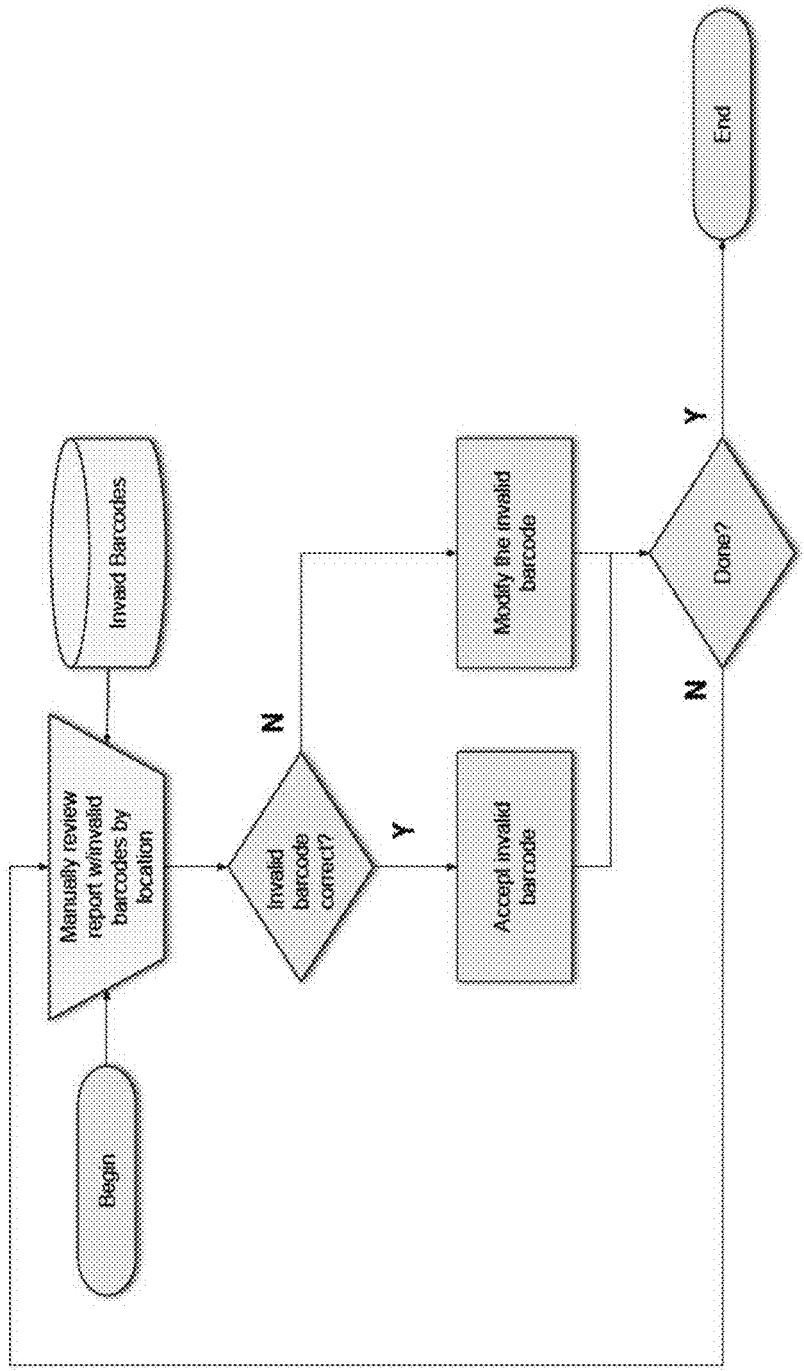
FIG. 11 depicts a step of reporting and resolving invalid items according to an embodiment of the present disclosure.

FIG. 11 depicts a step of reporting and resolving invalid items according to an embodiment of the present disclosure. As depicted herein, a review of a report with invalid barcodes by location may be performed. Any location tag containing barcodes not found in the business' list of valid barcodes (item master) may be reported. If the invalid barcode is correct, the invalid barcode may be accepted. If it is not correct, the invalid barcode may be modified. While invalid items may be ignored by the RFID reader program, invalid items still may enter the system through the barcode scan or by manual entry. A user may be presented with an interface with options to resolve each instance including, but not limited to, modify the invalid item, or accept the invalid item.

Figure 12:
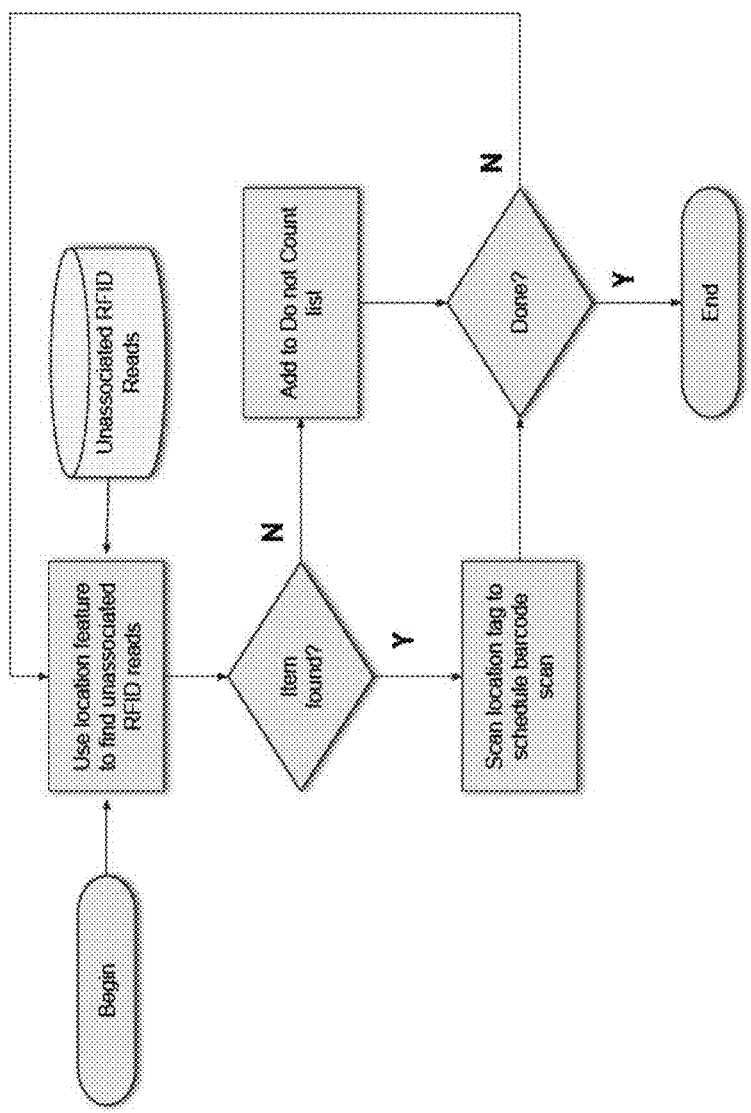
FIG. 12 depicts a step of reporting and resolving unassociated RFID reads according to an embodiment of the present disclosure.

FIG. 12 depicts a step of reporting and resolving unassociated RFID reads according to an embodiment of the present disclosure. This condition may occur when a rejected location tag's RFID contents are overwritten by a barcode scan. A location feature may be provided to find unassociated RFID reads or RFID reads not associated with any location tag. This location feature may be provided as part of an RFID reader application and may include sound, such as a beeping, that may become louder and/or more frequent as the reader approaches the target tag or softer and/or less frequent as the reader moves away from the target tag. If the tag is attached to an item which must be counted, the location tag's barcode may be scanned, or the location tag's chip may be read to schedule a barcode scan. If the RFID tag is accessible but not attached to an item, the RFID tag may be destroyed or rendered unreadable. If the tag is not accessible and cannot be physically destroyed or the RFID chip cannot be rendered unreadable, the user may be provided with an option to add it to the "do not count" list.

Figure 13:
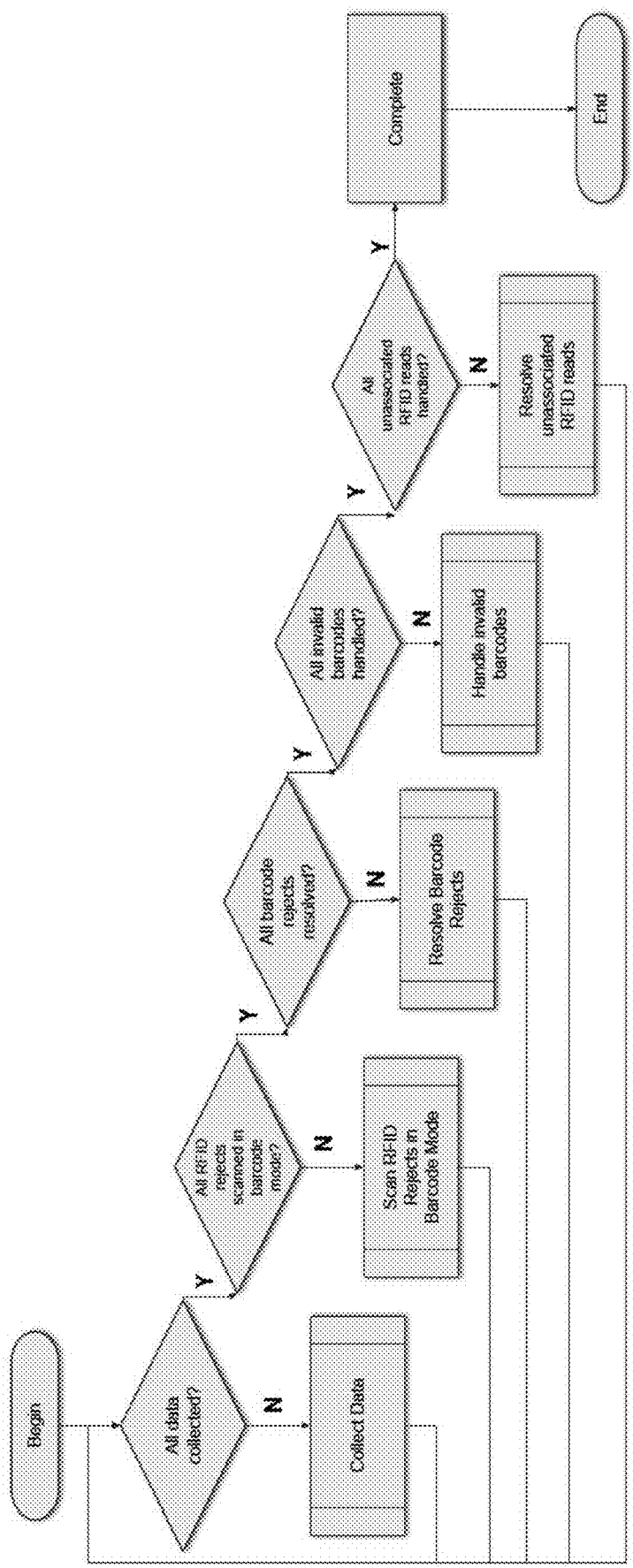
FIG. 13 depicts a step of completing the count according to an embodiment of the present disclosure.

FIG. 13 depicts a step of completing the count according to an embodiment of the present disclosure. A count may be completed when each of the following conditions have been met: all data is collected for all location tags recorded as used (i.e., RFID reads and manual piece counts); all count exceptions are resolved (i.e., all RFID rejects have been scanned in barcode mode and all barcode rejects are resolved); all invalid items are resolved; and all RFID reads not associated with any location tags are resolved. The steps may be repeated until each of the conditions described above have been met.

Location tags may be electronic (i.e., Bluetooth, RFID, NFC, and other similar electronic formats) having a barcode and/or human-readable text. However, it should be appreciated that there may be embodiments of the present disclosure where the location tags are not electronic and only include a barcode and/or human-readable text. It also should be appreciated that embodiments of the present disclosure may be used with permanent location tags to provide better location information for omnichannel fulfillment. In such embodiments, manual piece counts may not be required as general location information may be sufficient. In some embodiments of the present disclosure, in omnichannel fulfillment, the RFID read feature may be used without a focus on accuracy (i.e., without manual piece counts). It should be appreciated that better location information for omnichannel fulfillment can be achieved with the full accurate counting method or only with the RFID read feature.

Embodiments of the present disclosure may provide labor savings with respect to barcode scanning. It is estimated that use of systems and methods according to embodiments of the present disclosure may save approximately 60-85 percent of labor costs associated with barcode scanning depending on the number of barcode scans required due to failed total unit comparisons between the manual count on the location tag and the total RFID reads assigned by the system. Embodiments of the present disclosure also may increase the effective read accuracy of a typical RFID count. For example, at one retail location, use of systems and methods according to embodiments of the present disclosure may identify around 150 items without tags, which would never be found with current RFID counting practices. At another retailer, use of systems and methods according to embodiments of the present disclosure would have found over 100 RFID tags that are placed behind permanent fixtures in just one location, thereby allowing the retailer to properly exclude them from the final count.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method to validate radio frequency identification (RFID) counts comprising:
affixing location tags with barcodes through an area to be counted;
recording the location tags;
performing an RFID read of all items associated with each of the location tags, wherein the RFID read is associated with a most likely location tag, associating the RFID read with the most likely location tag further comprising:
ranking locations for each RFID tag by highest signal strength, highest average signal strength, and/or highest number of reads within a location's read timeframe;
calculating a combined score for each location and RFID combination; and
assigning the location with a highest combined score to each RFID tag;
comparing a piece count of all items associated with each of the location tags to the RFID read to identify whether the piece count matches the RFID read;
rejecting a location when the piece count does not match the RFID read; and
accepting a location when the piece count matches the RFID read.

2. The method of claim 1, wherein the location tags are temporary and are affixed prior to a count.

3. The method of claim 1, wherein the location tags are permanent.

4. The method of claim 1 further comprising:
using a barcode scanner, recounting when the piece count does not match the RFID read; and
comparing the barcode scans from the recount to the RFID read to identify whether a count from the barcode scans matches a count from the RFID read.

5. The method of claim 4 further comprising:
performing resolution for locations where the count from the barcode scans does not match the count from the RFID read.

6. The method of claim 1, the performing the RFID read step further comprising:
uploading to a server one or more items of RFID tag data selected from the following: a location tag identifier, start time, end time, RFID tag, number of reads and/or average signal strength for each RFID tag.

7. The method of claim 1 further comprising:
identifying unassociated RFID reads or RFID reads not associated with any location tag;
scanning a barcode attached to the tag associated with an item to be counted; and
adding inaccessible tags or unreadable RFID tags to a do not count list.

8. The method of claim 1 further comprising:
completing a count when all data is collected for all location tags recorded as used, all count exceptions are resolved, all invalid items are resolved, and all RFID reads not associated with any location tags are resolved.

9. The method of claim 1, wherein the location tags are electronic and have a barcode and/or human-readable text.

10. A method to validate radio frequency identification (RFID) counts comprising:
affixing location tags with chips to be read through an area to be counted;
recording the location tags;
performing an RFID read of all items associated with each of the location tags, wherein the RFID read is associated with a most likely location tag, associating the RFID read with the most likely location tag further comprising:
ranking locations for each RFID tag by highest signal strength, highest average signal strength, and/or highest number of reads within a location's read timeframe;
calculating a combined score for each location and RFID combination; and
assigning the location with a highest combined score to each RFID tag;
comparing a piece count of all items associated with each of the location tags to the RFID read to identify whether the piece count matches the RFID read;
rejecting a location when the piece count does not match the RFID read; and
accepting a location when the piece count matches the RFID read.

11. The method of claim 10, wherein the location tags are temporary and are affixed prior to a count.

12. The method of claim 10, wherein the location tags are permanent.

13. The method of claim 10, the performing the RFID read step further comprising:
   uploading to a server one or more items of RFID tag data selected from the following: a location tag identifier, start time, end time, RFID tag, number of reads and/or average signal strength for each RFID tag.

14. The method of claim 10 further comprising:
   completing a count when all data is collected for all location tags recorded as used, all count exceptions are resolved, all invalid items are resolved, and all RFID reads not associated with any location tags are resolved.

* * * * *